(12) United States Patent
Nakao (10) Patent No.: US 9,413,693 B2
(45) Date of Patent: Aug. 9, 2016

(54) NETWORK RELAY APPARATUS AND PROGRAM

(71) Applicant: THE UNIVERSITY OF TOKYO, Tokyo (JP)

(72) Inventor: Akihiro Nakao, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 95 days.

(21) Appl. No.: 14/398,453

(22) PCT Filed: May 1, 2013

(86) PCT No.: PCT/JP2013/062714
§ 371 (c)(1),
(2) Date: Nov. 1, 2014

(87) PCT Pub. No.: WO2013/165015
PCT Pub. Date: Nov. 7, 2013

(65) Prior Publication Data
US 2015/0131671 A1    May 14, 2015

(30) Foreign Application Priority Data

May 2, 2012  (JP) ................................. 2012-105242
Jun. 29, 2012  (JP) ................................. 2012-147799

(51) Int. Cl.
*H04W 4/00*      (2009.01)
*H04L 12/947*    (2013.01)
*H04L 12/933*    (2013.01)
*H04L 9/32*      (2006.01)

(52) U.S. Cl.
CPC ................ *H04L 49/25* (2013.01); *H04L 49/15* (2013.01); *H04L 9/32* (2013.01)

(58) Field of Classification Search
CPC ............................... H04L 49/25; H04L 49/15
USPC ........................... 370/328–339; 709/201–232
See application file for complete search history.

(56) References Cited

U.S. PATENT DOCUMENTS

| | | | |
|---|---|---|---|
| 2002/0150114 A1 | 10/2002 | Sainomoto et al. | |
| 2006/0209835 A1 | 9/2006 | Sainomoto et al. | |
| 2014/0189060 A1* | 7/2014 | Westphal .......... | H04W 36/0016 709/217 |

FOREIGN PATENT DOCUMENTS

| | | |
|---|---|---|
| JP | 2002-281070 A | 9/2002 |
| JP | 2007-74283 A | 3/2007 |

OTHER PUBLICATIONS

Japan Patent Office, Office Action for Japanese Patent Application No. 2012-147799, Jan. 26, 2016.
International Search Report for PCT/JP2013/062714, Jul. 16, 2013.
Dr. Marcus Brunner, Programmable Flow-based Networking with OpenFlow, paper, Mar. 10, 2010, pp. 1-16.
International Preliminary Report on Patentability for PCT Application No. PCT/JP2013/062714, Jul. 16, 2013.

* cited by examiner

*Primary Examiner* — Iqbal Zaidi (57) ABSTRACT

Provided is a network relay apparatus allowing flexible operations. Data including information for selecting any of the switch portions is received through any of the communication ports, and on the basis of the switch portion selection information, a switch portion is selected as an output destination, and data is transferred to the selected switch portion. In the switch portion, the process is executed on the basis of instruction information which represents the content of the process to be executed designated by the user.

2 Claims, 8 Drawing Sheets

| Condition | Processing Content |
|---|---|
| Received at Port No. 1 | aaaa |
| Transmission Source IP=bbbb | cccc |
| ⋮ | ⋮ |
| ⋮ | ⋮ |

NETWORK RELAY APPARATUS AND PROGRAM

TECHNICAL FIELD

Present disclosure relates to a network relay apparatus such as a network switch, and a program therefor.

BACKGROUND ART

With the recent prevalence and development of network technologies, a switch device capable performing higher communication, and flexibly compatible to new protocols, etc., has been desired.

Such a switch may be an openflow network, etc., described in, for example, Dr. Marcus Brunner, "Programmable Flow-based Networking with OpenFlow" (http://docbox.etsi.org/Workshop/2010/201003_FNTWORKSHOP/7_ARCHITECTURE/BRUNNER_OpenFlow.pdf, hereinbelow, referred to as Non-Patent Document 1).

Figure 11:
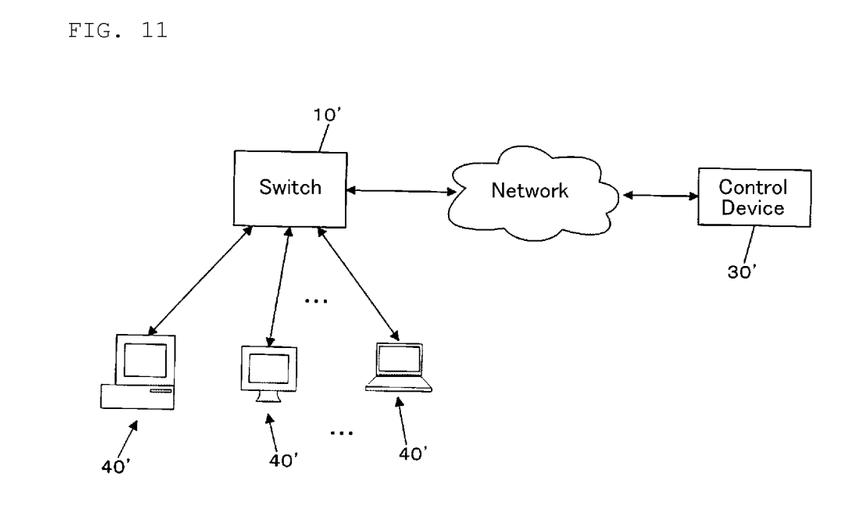
FIG. 11 is an explanatory view showing an example of a conventional switch.

FIG. 11 illustrates an outline of the openflow network. The network shown in this example comprises a switch 10', a control device 30', and a plurality of terminal apparatuses 40'. The switch 10' has a plurality of network ports, and each of the terminal apparatuses 40' is connected to any one of the network ports of the switch 10'. The switch 10' and the control device 30' are connected to each other via a network (Internet, etc.) so as to be mutually communicable.

When the terminal apparatus 40' is activated, the terminal apparatus 40' starts data transmission to the switch 10'. The data is divided into frames, and the first frame (the first frame received from the terminal apparatus 40') is transmitted by the switch 10' to the control device 30'. Here, communication between the switch 10' and the control device 30' are encrypted by SSL, etc.

Upon receiving the frame from the switch 10', the control device 30' judges, in accordance with a predetermined judgment criterion, whether or not a new process is necessary relating to the communication with the terminal apparatus 40' which has transmitted the frame. When judging that a new process is necessary, in accordance with the judgment, the control device 30' transmits the information defining the content of the necessary process to the switch 10'. The switch 10' receives and stores the information, and subsequently, executes the process defined by the information.

The content of the process defined by this information includes a rule and an action. Here, the rule refers to information representing what the object is, and the action refers to a specific content of a process relating to the object. As an example, when a content of a process is defined, and in the content, the rule is a specific port number, and the action is multicast, the switch 10' operating in accordance with this definition, performs multicast of the data which has been received from the terminal apparatus 40' through a port having the specific port number, through another port.

According to this example, in accordance with a condition predetermined by a user (for example, communication using a specific protocol), if the first frame transmitted/received between the terminal apparatus 40' and the switch 10' satisfies this condition, and the judgment reveals the start of communication requiring a new process (for example, judgment reveals the start of communication using the specific protocol), the control device 30' transmits information defining the new process (information defining a process relating to the above specific protocol, etc.), and subsequently, the switch 10' performs the process on the basis of the information, and becomes compatible with the new protocol.

SUMMARY

However, according to the above-mentioned conventional switch, when the communication between the switch and the control device is intercepted, communication to a newly activated terminal apparatus cannot be initiated. Further, according to the openflow system, although each of a plurality of users can add a process, the each of a plurality of users cannot perform a test independently of each other by applying a process thought of by himself/herself. Therefore, operations cannot be flexible.

The present disclosure has been made taking the above situation into account, and one of the objectives of the present disclosure is to provide a network relay apparatus capable of allowing flexible operations.

In order to solve the above drawbacks, present disclosure discloses a network relay apparatus comprising a redirect portion and m switch portions (m>=1); the redirect portion comprising, n communication ports (n>1), a reception device which receives data including information for selecting one of the switch portions and data body which is to be transmitted, from any one of the communication ports, a transfer device which selects a switch portion as an output destination on the basis of the information for switch selection, and transfers data including the data body to the selected switch portion, and a transmission device which receives the data including the data for specifying the communication port selected as the output destination and the data body, from the switch portion which has transferred the data, and transmits data including the data body through the communication port which is specified as the output destination by the information; and each of the switch portions comprising, a process content holding device which holds instruction information representing the content of a designated process, a processing device which refers to the held instruction information, and executes the process regarding the data to be transferred from the redirect portion, and a transfer device which, on the basis of the result of the process execution, if the data body included in the data to be transferred from the redirect portion is output, transfers data including the data body and the information specifying the communication port selected as the output destination, to the redirect portion.

According to the present disclosure, a plurality of switch portions are set, and the switch portions can be appropriately selected, and thus, flexible operations become possible.

EMBODIMENT

An embodiment of the present disclosure will be explained with reference to the drawings. An example of a network relay apparatus 10 according to an embodiment of the present disclosure may be realized by one or a plurality of computer apparatuses. Specifically, a network relay apparatus 10 according to an example of the present embodiment is constituted by a plurality of ports 11, a control unit 12, a storage unit 13, and a communication unit 14, as exemplified in FIG. 1.

Figure 1:
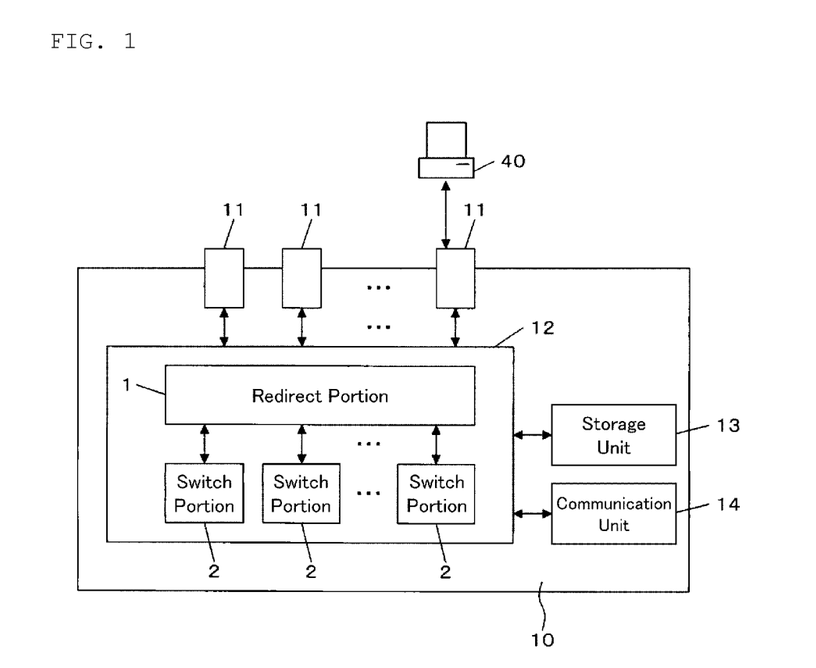
FIG. 1 is a block diagram showing a constitutional example of a network relay apparatus according to an embodiment of the present disclosure.

The port 11 is an example of a communication port according to the present disclosure, and is, for example, connected to a terminal apparatus 40 such as a personal computer, etc., to output data received from this connection destination to the control unit 12. Further, the port 11 transmits data input from the control unit 12 to the connection destination.

The control unit 12 is constituted to include a program control device such as a CPU, etc., and operates in accordance with a program stored in the storage unit 13. According to an example of the present embodiment, the control unit 12 includes functionally includes a redirect portion 1, and at least one (m pieces) switch portion 2, and executes processes as respective units. The content of the detailed process of the control unit 12 will be described below.

The storage unit 13 is a memory device, etc., which holds programs to be executed by the control unit 12. The programs may be provided by being stored in a computer readable and non-transitory recording medium, and copied and stored in the storage unit 13. Among the programs stored in the storage unit 13, at least a program related to the process as the switch portion 2 may be newly created or rewritable on the basis of the instructions received through, for example, the communication unit 14.

Specifically, in the present embodiment, the program relating to the process as the switch portion 2 is executed by the control unit 12, and thereby, functions as a program realizing the switch portion 2. Further, unique switch logic identification information is associated to the program as the switch portion 2. Also, the program as the switch portion 2 includes instruction information representing the content of each switching operation. Further, information for specifying a user, who is also a creator, and information regarding authorization (whether or not browsing/writing is allowed to a user other than a creator) may be associated with this program.

The control unit 12 authenticates a user, and waits for instructions for storing a program in the storage unit 13, or browsing or rewriting the program. Here, upon receiving a request for storing a new program as a switch portion 2 in the storage unit 13, the control unit 12 receives the requested program, associates the program with the information specifying the authenticated user as a creator, and stores the program in the storage unit 13. In addition, information regarding authorization designated by the user is associated to the program and recorded. As an example, if the user who is a creator does not want to allow other users to browse and write the created data, settings to prohibit both browsing and rewriting is set. If the user who is a creator allows other users to browse the created data, but does not want to allow other users to rewrite the created data, settings to allow browsing but prohibit rewriting is set.

According to another aspect of the present embodiment, the control unit 12 may provide program execution environments which are independent of each other, such as a virtual machine, a resource container, etc., and a program as a switch portion 2 provided by each program creator may be operated in each program execution environment. In this case, only a user authorized for each program execution environment may be able to store and operate a program therein. Accordingly, each program creator can execute a program as a switch portion 2 on the trial basis while the program is not browsed, etc., by others.

Further, the storage unit 13 may operate as a work memory of the control unit 12. The communication unit 14 is, for example, a serial communication device, such as a USB, etc., which outputs received information to the control unit 12, and transmits in formation in accordance with the instructions input from the control unit 12.

The operations of the control unit 12 according to an example of the present embodiment will be explained. As already mentioned above, according to an example of the present embodiment, the control unit 12 functionally includes a redirect portion 1, and at least one (m pieces of) switch portion 2. The control unit 12 executes processes as an operating system such as Linux (registered trademark), etc., and a program for functioning the control unit 12 as a redirect portion 1, and a program for functioning the control unit 12 as a switch portion 2, are executed as programs on the operating system. As an example, according to the present embodiment, an environment in which a plurality of virtual machines are executed in parallel is introduced, and an operating system such as Linux (registered trademark), etc., may be executed as a guest OS in each of the virtual machines. Then, at least one program as a switch portion 2 is executed on each guest OS.

Figure 2:
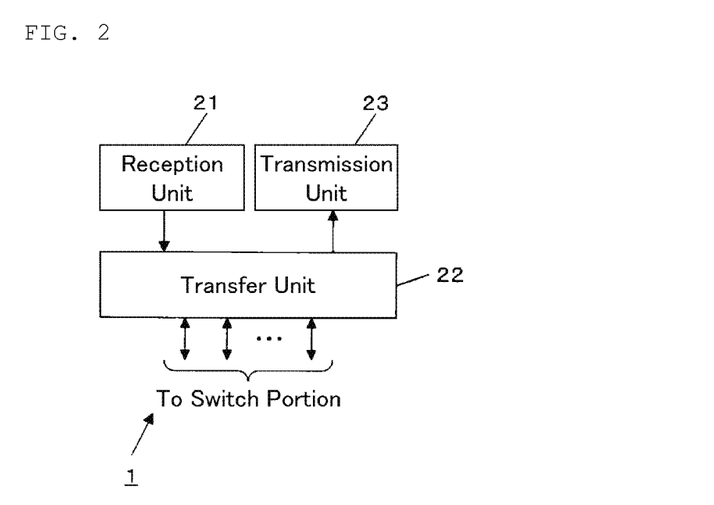
FIG. 2 is a block diagram showing a constitutional example of a redirect portion according to an embodiment of the present disclosure.
Figure 3:
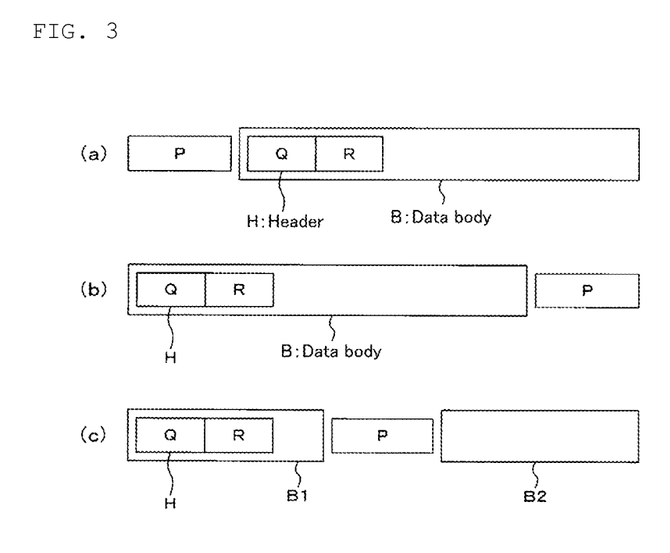
FIG. 3 is an explanatory view showing an example of data to be received by a network relay apparatus according to an embodiment of the present disclosure.

As exemplified in FIG. 2, the redirect portion 1 includes a reception unit 21, a transfer unit 22, and a transmission unit 23. Here, the reception unit 21 receives data, through a port 11 connected to the terminal apparatus 40, and from the connection party of the port 11, i.e., the terminal apparatus 40. The data received form the terminal apparatus 40 is a packet which includes switch logic identification information (P) for selecting a switch portion 2, and a data body (B) to be transmitted (FIG. 3(a) to FIG. 3(c)).

The data body (B) includes a header (H), and the header (H) includes transmission source specifying information (Q) and transmission destination specifying information (R).

The data body (B) is prefixed by the switch logic identification information (P) (namely, prefixed as a header for the data body (B)) (FIG. 3(a)), or suffixed by the data body (B)

(namely, suffixed as a trailer for the data body (B)) (FIG. 3(b)). The data body (B) may be divided into two portions, which are a first portion (B1) and a second portion (B2), and the switch logic identification information (P) may be located between these portions (FIG. 3(c)). Further, the switch logic identification information may be synthesized with the data body (B), using a technology referred to as digital watermarking.

Here, the information for specifying the transmission source and the transmission destination may be, for example, the MAC address. Further, in case of a protocol realizing a CCN (Context Centric Network), the header (H) may be merely identification information for the data body.

The transfer unit 22 extracts the switch logic identification information from the data received by the reception unit 21. The transfer unit 22 selects a switch portion 2 specified by the extracted switch logic identification information. In other words, the transfer unit 22 reads a program as the switch portion 2 associated with the extracted switch logic identification information from the storage unit 13, and activates the program. The control unit 12 executes the program. The transfer unit 22 extracts at least the data body, by removing the switch logic identification information from the data received by the reception unit 21.

When the data body is divided into two portions (FIG. 3(c)), the transfer unit 22 connects these portions to form an integral data body. Also, when the switch logic identification information is synthesized with the data body (B), using a technology referred to as digital watermarking, the transfer unit 22 extracts the synthesized switch logic identification information, and also extracts information regarding the data body prior to the synthesis with the switch logic identification information, and thereby, extracts the data body after the removal of the switch logic identification information. Further, the transfer unit 22 obtains port identification information (port number etc., previously set for the port 11) for identifying the port 11 of the reception unit 21 which has received the data. The transfer unit 22 transfers data including the port identification information and the data body extracted from the data received by the reception unit 21, to the selected switch portion 2. Namely, the transfer unit 22 provides the data to the process of the program as the switch portion 2 which has been executed.

When the data received by the reception unit 21 is broadcast data, in place of the above processes, the transfer unit 22 may obtain port identification information (port number etc., previously set for the port 11) for identifying the port 11 which has received the broadcast data, and transfer the received data together with the port identification information to each switch portion 2.

Figure 4:
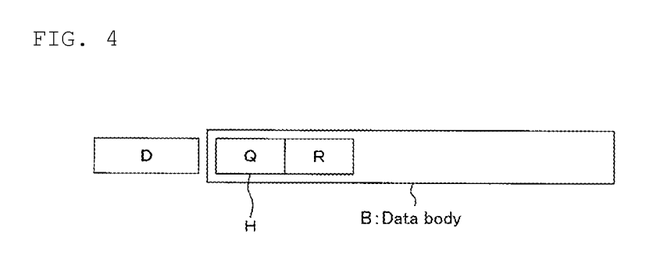
FIG. 4 is an explanatory view showing an example of data to be received by a network relay apparatus according to an embodiment of the present disclosure.

The transmission unit 23 receives data including information (D) for specifying the output destination port 11 and the data body (B), as exemplified in FIG. 4, from the switch portion 2 to which the transfer unit 22 has transferred the data. The data body (B) includes the header (H). The transmission unit 23 removes the information for specifying the port 11 from the received data, and extracts the data body. Then, the transmission unit 23 transmits data including the extracted data body through the output destination port 11 specified by the information included in the received data.

Figure 5:
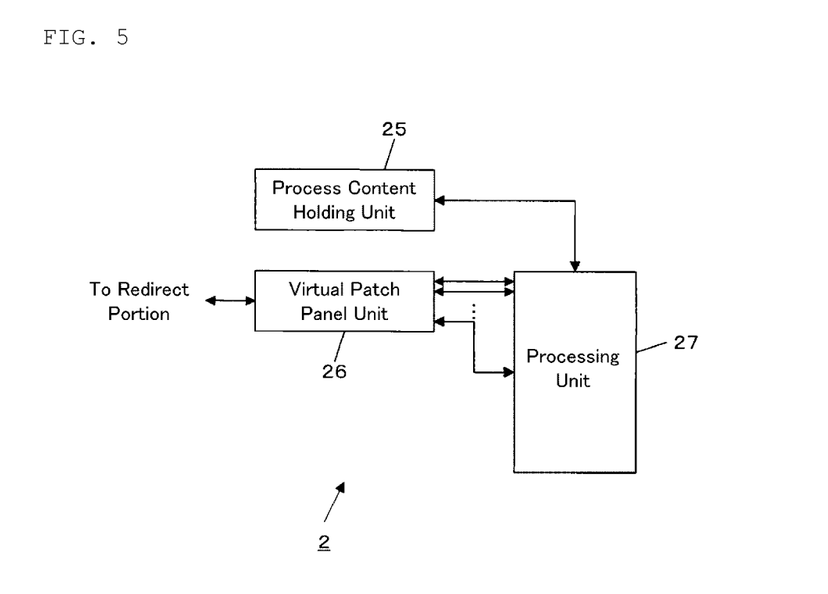
FIG. 5 is a block diagram showing a constitutional example of a switch portion of a network relay apparatus according to an embodiment of the present disclosure.
Figure 6:
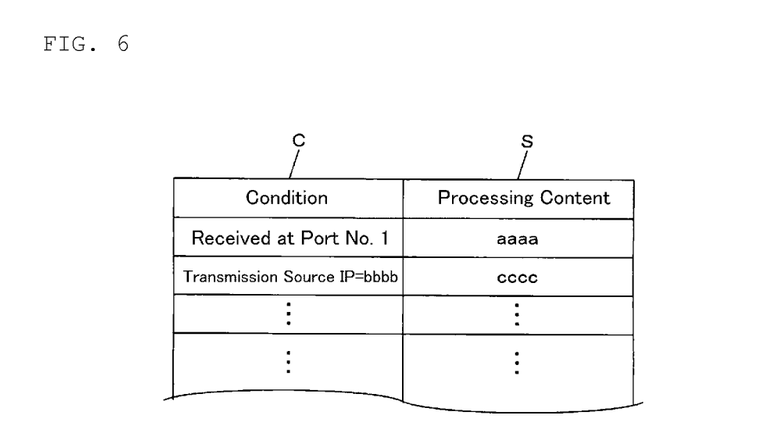
FIG. 6 is an explanatory view showing an example of instruction information in a switch portion of a network relay apparatus according to an embodiment of the present disclosure.

The switch portion 2 is constituted to functionally comprise a process content holding unit 25, a virtual patch panel unit 26, and a processing unit 27, as exemplified in FIG. 5. Here, the process content holding unit 25 may be realized by using, for example, a part of the storage unit 13. According to an example of the present embodiment, the information representing the process content is instruction information included in the program as the corresponding switch portion 2, stored in the storage unit 13. The instruction information is defined, for example, as exemplified in FIG. 6, as information in which a condition (C) using information (information for specifying a transmission source, information for specifying a transmission destination, or the like) included in at least a part of the data body, such as the port identification information, the header H, or the like, is associated with the information (S) representing the process which is to be performed. An example of such instruction information is the OpenFlow, and the switch portion 2 according to the present embodiment may function as an openflow switch. Further, the instruction information may not be the table information in which the condition and the process are associated, but may be a series of instruction sequence to be executed by the control unit 12. In this case, depending on the description of the instruction sequence, various processes may be performed, because the processes are not limited to the process of the switch-case logic which can be set by the table information.

The virtual patch panel unit 26 received the data transferred by the redirect portion 1, and output the data to the processing unit 27. Also, when the data is input from the processing unit 27, the virtual patch panel unit 26 transfers the input data to the redirect portion 1.

In the present embodiment, the processing unit 27 is provided with n virtual ports corresponding to the n ports 11 of the redirect portion 1. The virtual patch panel unit 26 refers to the port identification information included in the data transferred by the redirect portion 1, and transfers the data transferred by the redirect portion 1 to a virtual port of the processing unit 27 corresponding to the port 11 identified by the port identification information. The virtual patch panel unit 26 may remove the port identification information from the data to be transferred to the processing unit 27 (compatibility between the program of the processing unit 27 and the program of the conventional switch is taken into account).

In response to the data input from any of the virtual ports of the processing unit 27, the virtual patch panel unit 26 adds the information specifying the port 11 corresponding to the virtual port which has performed the data input (port identification information), to the input data, and transfers the data to the redirect portion 1.

The processing unit 27 receives the data transferred from the virtual patch panel unit 26 through any one of the virtual ports. The specific process of the processing unit 27 may correspond to the process at the L2 switch in the conventional network relay apparatus. Namely, the processing unit 27 extracts a header H which includes the transmission source or transmission destination specifying information (MAC address), from the data received through the virtual port. Then, the processing unit 27 obtains information predeterminedly held in the process content holding unit 25, the information representing a process which should be performed.

An example of this process may be a process relating to the information representing the virtual port from which the data is received (corresponding to the port identification information), at least one piece of the information included in the extracted header H (the transmission source specifying information or the transmission destination specifying information).

According to an example of the present embodiment, the processing unit 27 executes a process represented by the obtained information, and the process may be unicast to transmit data through a specific port 11 of the redirect portion 1, multicast to transmit data through a plurality of ports 11 of the redirect portion 1, data disposal, data encoding, encapsulation by adding header information, etc., counting the number of packets in the data or data capacities, QoS control, transmission control through a tunnel, and the like.

As a result of executing the process represented by the obtained information, if the processing unit 27 should determine one of the ports 11 of the redirect portion 1 as an output destination, and should output data through the port 11 determined as the output destination, the processing unit 27 outputs the data including the data body to the virtual patch panel unit 26 through the virtual port corresponding to the destined port 11.

Figure 7:
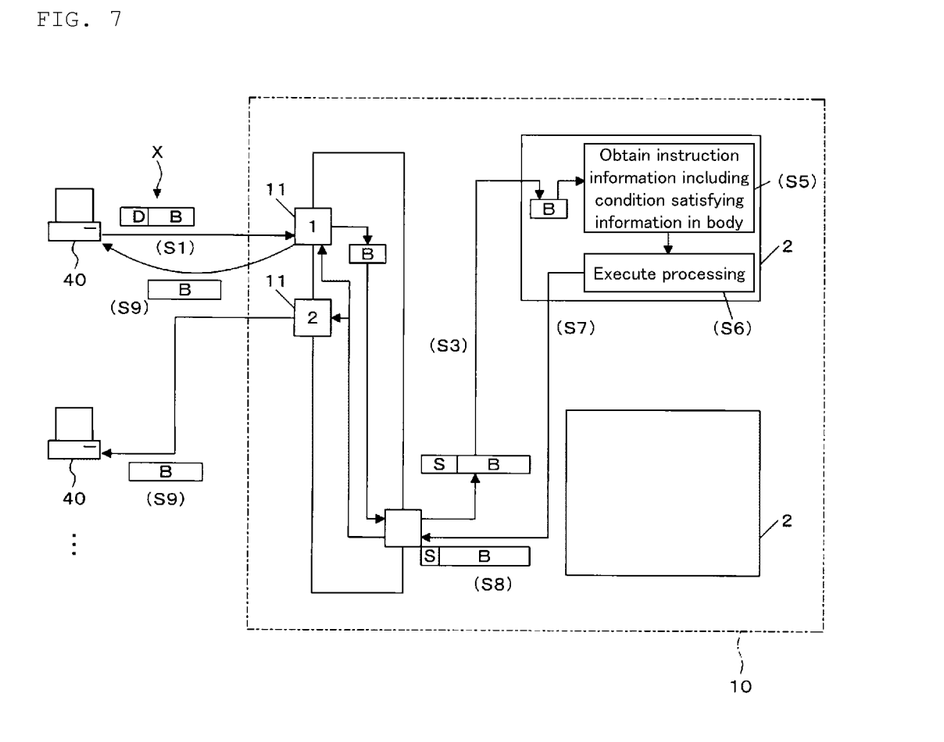
FIG. 7 is a flowchart showing an operation example of a network relay apparatus according to an embodiment of the present disclosure.

The network relay apparatus 10 according to the present embodiment is constituted as above, and operates as exemplified in FIG. 7. In the following explanation, pieces of instruction information which are different from each other are previously stored in the process content holding unit 25 of each switch portion 2.

Also, in the explanation, the switch logic identification information for selecting a switch portion included in the data is virtual LAN (VLAN) identifying information (slice identifier), and in the redirect portion 1, the value of each slice identifier is associated with the switch logic identification information which specifies the switch portion 2 as the transfer destination. Further, terminal apparatuses 40a, 40b, . . . , are respectively connected to the ports 11a, 11b, . . . , of the redirect portion 1.

The user includes the switch logic identification information (slice identifier) for selecting the switch portion 2 executing the switching process which the user desires, in the data to be transmitted, and transmits the data from the terminal apparatus 40 (S1). To this end, for example, a program for communication is previously generated and installed in the terminal apparatus 40, so that a packet exemplified in FIG. 3 is generated.

For example, the data that the terminal apparatus 40a transmits to the network relay apparatus 10 according to the present embodiment is a packet exemplified in FIG. 3 (X in FIG. 7) which includes the switch logic identification information for selecting the switch portion 2 designated by the user of the terminal apparatus 40a.

Figure 8:
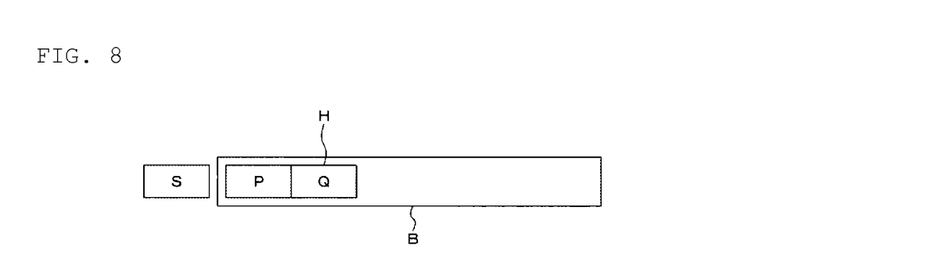
FIG. 8 is an explanatory view showing an example of data used within a network relay apparatus according to an embodiment of the present disclosure.

The reception unit 21 of the redirect portion 1 in the network relay apparatus 10 receives the data through the port 11a from the terminal apparatus 40a. The transfer unit 22 of the redirect portion 1 extracts switch logic identification information for selecting a switch portion 2 from the data received by the reception unit 21 (S2). Here, the terminal apparatus 40a uses a conventional MAC address, and the data includes the switch logic identification information for selecting the switch portion 2a. The transfer unit 22 removes the switch logic identification information for selecting the switch portion 2a, extracts the remains (data body) of the received data, and adds information (port identification information: S) for specifying the port 11a, and thereby, generates data to be transferred (FIG. 8). Then, the transfer unit 22 transfers the generated data to be transferred to the selected switch portion 2a (S3). Here, the port identification information may be a number of the port 11 (VNIC tag).

The virtual patch panel unit 26 of the switch portion 2a received the data transferred by the redirect portion 1, removes the port identification information, and outputs the data body, i.e., data after the removal of the port identification information, to the virtual port of the processing unit 27 corresponding to the removed port identification information (S4). The processing unit 27 extracts, through any one of the virtual ports, the header H (information for specifying the transmission source or the transmission destination, etc.) included in the data body received from the virtual patch panel unit 26. Then, the processing unit 27 refers to the received virtual port specifying information (i.e., virtual port number, port identification information itself) and the information included in the extracted header H, examines whether or not any of the conditions held in the process content holding unit 25 can be satisfied by the referred-to information, and, if there is a condition which can be satisfied, obtains instruction information including the condition that is to be satisfied (S5). Then, the processing unit 27 executes the process specified by instruction information included in the obtained instruction information (S6). As mentioned above, the instruction information held by the process content holding unit 25 does not have to be such conditions associated with processes, but can be described as a series of instruction sequence of processes.

As an example, here, the data obtained based on the port identification information of the port 11a is subjected to a process to multicast through a plurality of ports 11 of the redirect portion 1. In this example, the processing unit 27 outputs the data from virtual ports respectively correspond to the ports 11a, 11b, . . . (S7).

In response to the input of the data through the virtual port of the processing unit 27, the virtual patch panel unit 26 adds the input data with port identification information corresponding to the virtual port through which the data has been input, and transfer the data after the addition to the redirect portion 1 (S8). The data has a structure similar to the structure exemplified in FIG. 8. As can be seen from this example, when the multicast is performed, a plurality of pieces of data respectively added with pieces of port identification information corresponding to the ports 11, are sequentially transferred to the redirect portion 1.

The redirect portion 1 receives the data including port identification information which is the information specifying the output destination port 11, from the switch portion 2a. The transmission unit 23 of the redirect portion 1 extracts data body included in the received data, adds the information for selecting the switch portion 2a, which has been removed in Step S3, and reconfigures the packet exemplified in FIG. 3. The transmission unit 23 transmits the packet data through the port designated by the switch portion 2a (since this is the case of multicast, all ports 11) (S9).

Similar to an ordinary switch, upon activation of the terminal apparatus 40, the processing unit 27 of the switch portion 2 receives data including the MAC address of the interface of the terminal apparatus 40, through a virtual port corresponding to the port 11 connected to the terminal apparatus 40, associates the virtual port specifying information (port identification information) with the MAC address included in the received data, and stores the associated data as an address table.

According to the process on the basis of the instruction information, if the processing unit 27 should transmit the data to the transmission destination specified by the information included in the data, the processing unit 27 obtains the port identification information corresponding to the transmission destination specifying information (MAC address) and transmits the data through the virtual port corresponding to the port 11 specified by the port identification information.

According to another example of the present embodiment, for example, the switch portion 2a executes a layer 2 switching (L2 switch) process on the basis of the conventional MAC address (48-bit length), and the switch portion 2b executes a layer 2 switching (L2 switch) process on basis of the extended MAC address exceeding 48 bits.

In this case, the terminal apparatus 40 using the conventional MAC address for data transmission/reception, transmits data body while the switch logic identification information for selecting the switch portion 2a is added to the data body, whereas the terminal apparatus 40 using the extended MAC address for data transmission/reception, transmits data body while the switch logic identification information for selecting the switch portion 2b is added to the data body.

Further, according to still another example of the present embodiment, for example, the switch portion 2a may execute the layer 2 switching (L2 switch) process, whereas the switch portion 2b may executes a switching process on the basis of the CCN (Content Centric Network: V. Jacobson, D. K. Smetters, J. D. Thornton, M. F. Plass, N. H. Briggs, R. L. Braynard (PARC), Networking Named Content, CoNEXT 2009, Rome, December, 2009).

Figure 9:
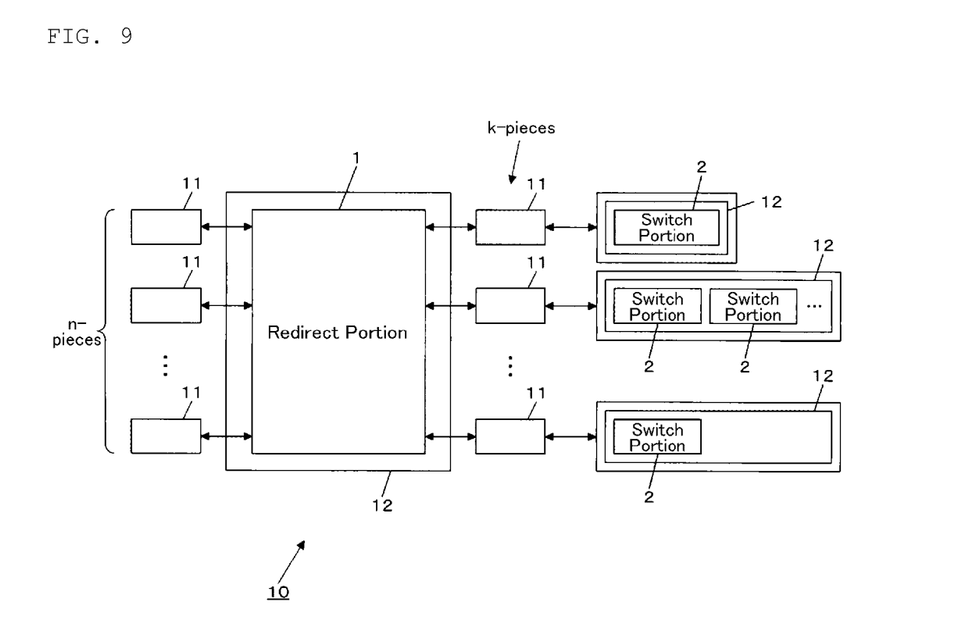
FIG. 9 is a block diagram showing another constitutional example of a network relay apparatus according to an embodiment of the present disclosure.

Further, according to another example of the network relay apparatus 10 of the present embodiment, the redirect portion 1 and the switch portion 2 may be realized as separate devices. As shown in FIG. 9, the network relay apparatus 10 according to such an example of the present embodiment, the redirect portion 1 may be realized as a switch device provided with (n+k), wherein the n ports may be connected to the terminal apparatus 40 (corresponding to the communication ports of the present disclosure) and k ports may be connected to at least one computer apparatus which operates as a switch portion 2.

In this aspect of the embodiment, m switch portions 2 may be realized by k (1 ≤k≤m) computer apparatuses. When one computer apparatus functions as a switch portion 2, a program as the switch portion 2 should be installed to the operating system of the computer apparatus, so that the one computer apparatus executes processes as one switch portion 2. When one computer apparatus functions as a plurality of switch portions 2, i.e., p switch portions, for example, an environment for executing p virtual machines in parallel is executed on the host operating system, and a guest operating system is operated on each virtual machine, a program realizing the operation as the switch portion 2 is installed in each operating system operating on each virtual machine, and a process as the switch portion 2 is executed on each operating system.

Further, according to an aspect of the present embodiment, a plurality of computer apparatuses may operate as the redirect portion 1. Also in this case, one operating system may be operated on one computer apparatus and a program for executing the process as the redirect portion 1 on the operating system, or a plurality of operations systems may be virtually operated on one computer apparatus and a program for executing the process as the redirect portion 1 on each of the operating systems.

In this example, similar to the example shown in FIG. 2, the switch device functioning as the redirect portion 1 functionally comprises a reception unit 21, a transfer unit 22, and a transmission unit 23. However, this example is different in the point that the transfer unit 22 and the transmission unit 23 communicates with the computer apparatus functioning as the switch portion 2 through the port 11.

In the present example, the transfer unit 22 extracts the switch logic identification information for selecting the switch portion 2, from the data received by the reception unit 21. The transfer unit 22 selects the port 11 which is connected to the computer apparatus operating as the switch portion 2 selected by the extracted switch logic identification information. The selection of port 11 may be performed by previously storing the switch logic identification information for selecting the switch portion 2 in association with the information for specifying the port connected to the computer apparatus functioning as the switch portion 2 selected by the switch logic identification information, as a port selection table, and by selecting the port 11 specified by the information associated with the switch logic identification information for selecting the extracted switch portion 2, with reference to the port selection table.

The transfer unit 22 extracts, from the data received by the reception unit 21, the data body which includes at least the information for specifying the transmission source and the transmission destination. Also, the transfer unit 22 obtains port identification information (port number, etc., previously set for the port 11) for identifying the port 11 through which the reception unit 21 has received the data. Then, the transfer unit 22 transfers the port identification information and the data body including the extracted transmission source/transmission destination information, through the selected port 11 to the NIC (network interface card, which may be a physical card or a virtual card (described below)) of the computer apparatus operating as the switch portion 2.

When the data received by the reception unit 21 is broadcast data, in place of the above processes, the transfer unit 22 may obtain port identification information (port number, etc., previously set for the port 11) for identifying the port 11 which has received the broadcast data, and may transfer the received data together with the port identification information to each switch portion 2.

Similar to the example shown in FIG. 5, the computer apparatus functioning as the switch portion 2 comprises a process content holding unit 25, a virtual patch panel unit 26, and a processing unit 27. However, the present example is different in the point that, when the computer apparatus functions as a plurality of switch portions 2, the virtual patch panel unit 26 receives the data from the host operating system.

Namely, in this case, the host operating system sets a plurality of virtual NICs respectively corresponding to the guest operating systems, on the physical NICs provided in the computer apparatus. The data from the redirect portion 1 is received through each virtual NIC. The host operating system transfers the data to the virtual patch panel unit 26 of the switch portion 2 which operates on the guest operating system corresponding to the virtual NIC which has received the data.

The virtual patch panel unit 26 receives the transferred data, and outputs the data to the processing unit 27. Also, in response to the data input from the processing unit 27, the virtual patch panel unit 26 transfers the input data through the virtual NIC of the corresponding guest operating system, to the redirect portion 1.

Further, the virtual patch panel unit 26 and the processing unit 27 of one switch portion 2 may be realized as processes operated on mutually different operating systems.

According to the present embodiment, a network relay apparatus which can operate in a distributed and self-directed manner without requiring other control device, and which allows the user to switch the plurality of switch portions, can be provided, and thus, a flexible operation becomes possible.

Figure 10:
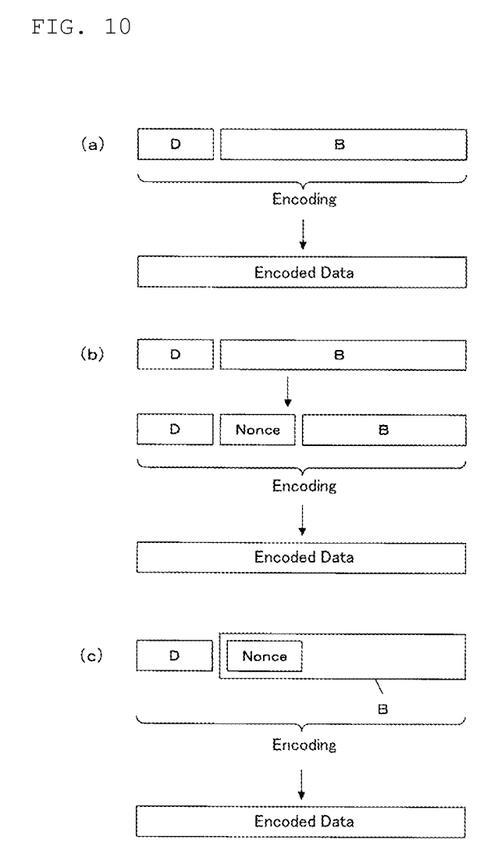
FIG. 10 an explanatory view showing another example of data to be received by a network relay apparatus according to an embodiment of the present disclosure.

Further, in the present embodiment, the data received by the redirect portion 1 from the terminal apparatus 40 may be encrypted. FIG. 10 is an explanatory view showing another example of the data to be received by the network relay apparatus according to an embodiment of the present disclosure. As exemplified in FIG. 10, the data encoding may be performed by a method for directly encrypting the entirety of the data including the switch logic identification information and the data body (FIG. 10(a)), a method for generating data by adding a random value (R) to the switch logic identification information and the data body, and encrypting the generated data (FIG. 10(b)), and the like. The encoding method applied therefor may be a method having a necessary strength, such as a shared-key encoding, a public-key encoding, and the like.

In this case, the redirect portion 1 decodes the encoded data using a decoding key by a predetermined method, and obtains data to be output to the switch portion 2 using the decoded data. When the random value (R) is added, the redirect portion 1 deletes the random value (R) from the decoded data, and obtains the data to be output to the switch portion 2.

By encoding as mentioned above, the switch logic identification information can be prevented from being extracted from the data and abused. As exemplified in FIG. 10(*b*), by using Nonce such as a random value, etc., the abuse of a set of a specific switch logic identification information and a specific data body as a whole, can be prevented from being occurred. As exemplified in FIG. 10(*c*), the random value may be included in a part of the data body (an example in which a part of the data body is used as Nonce).

The information for specifying the key to be used for decoding may be transmitted with the encrypted data body. The decoding method may be performed that information (referred to as magic) which represents a known value on the decoding side, is encoded with the data body, the magic being included in the data body or being separate from the data body. At the decoding side, a plurality of keys, i.e., decoding key candidates, are sequentially tried, and when the magic included in the tried decoding result matches the known value, the tried key is assessed as the decoding key.

In the above explanation, the pieces of data input through the port 11 to the control unit 12 are respectively processed by the switch portions 2 identified by the switch logic identification information, and thus, the whole data may be a mixture of data pieces having various formats (each piece of data is associated with the switch logic identification information).

As an example of the format, the data may Ethernet (registered trademark) frame type data. In this case, upon receiving the data, the control unit 12 refers to, for example, a Type value included in the Ethernet (registered trademark) to assess whether or not the Type value is a predetermined reserved value (for example, 0×00ff). If the Type value is the predetermined reserved value, the received data is treated to include the switch logic identification information and the above-described processes may be performed. If the Type value is not the reserved value, a process as a conventional switch (a process to treat the packet as a packet which does not include the switch logic identification information) may be performed.

Figure 12:
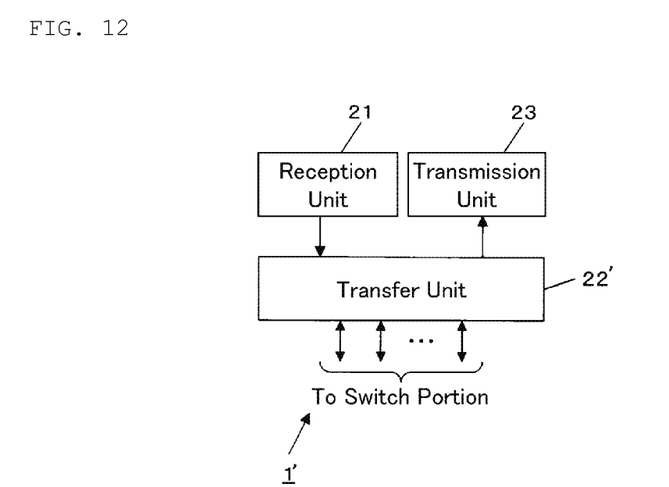
FIG. 12 is a block diagram showing a constitutional example of a redirect portion of a network relay apparatus according to another embodiment of the present disclosure.

Further, as exemplified in FIG. 12, the redirect portion 1' according to an embodiment of the present disclosure comprises a reception unit 21, a transfer unit 22', and a transmission unit 23. For the components same as those shown in FIG. 2, same numerals are assigned and detailed explanation therefor is omitted.

The transfer unit 22' extracts switch logic identification information from the data received by the reception unit 21, in accordance with a rule determined by a user using a program, etc. For example, when the switch logic identification information is included in the data as it is, the rule maybe extracting an offset value from the start of the data to the position where the switch logic identification information locates. In this case, according to an example of the transfer unit 22', the switch logic identification information does not have to be explicitly included in the data. For example, the transfer unit 22' retrieves a pattern defined for each switch logic identification information, from the data. Then, the transfer unit 22' extracts switch logic identification information determined to be associated to the pattern found through the data retrieval.

According to the latter example, the user includes the pattern in the data to be transmitted, the pattern being predetermined in association with the switch logic identification information (slice identifier) for selecting the switch portion 2 which executes the switching process that the user desires, and transmits the data from the terminal apparatus 40. The pattern may be, for example, a specific character string.

The transfer unit 22' also selects a switch portion 2 specified by the switch logic identification information extracted as above. Namely, the transfer unit 22' reads the program as the switch portion 2 associated with the extracted switch logic identification information from the storage unit, and the program is executed (activated) by the control unit 12. Then, when the switch logic identification information is explicitly included in the data, the transfer unit 22' removes the explicitly included switch logic identification information from the data received by the reception unit 21, and extracts at least the data body.

The transfer unit 22' obtains port identification information (port number, etc., preset for the port 11) for identifying the port through which the reception unit 21 has received the data. Then, the transfer unit 22' transfers data including this port identification information and the data body extracted from the data received by the reception unit 21, to the selected switch portion 2. Namely, the transfer unit 22' provides the data to the process of the program as the switch portion 2, which has started to be executed.

In the above explanation, at least one program as the switch portion 2 is executed on each guest OS, and the switch portion 2 is configured to comprise the process content holding unit 25, the virtual patch panel unit 26, and the processing unit 27, as shown in FIG. 5. However, since the process of the switch portion 2 is a process having a comparatively large load, when the process is operated on each guest OS, the control unit 12 receives a too large load. Therefore, according to an example of the present embodiment, the control unit 27 of the switch portion 2 may be divided into a portion which performs a process as a control plane (C plane) managing the logical operations as the switch, and a portion which performs a process as a data plane (D plane) performing specific operations as the switch. A part of the switch portions 2' (dash is applied for easy distinction) may be provided with the C plane and the D plane, and the other switch portions 2" (two-dash is applied for easy distinction) may be provided with only the C plane and may share the D plane of any of the switch portions 2'. In this case, in order to prevent the information representing the process content stored in the process content holding unit 25 of the switch portion 2" from being rewritten by the program operating on the guest OS which operates the switch portion 2', the process content holding unit 25 of the switch portion 2" may be set as incapable of being overwritten by other switch portions 2', 2", for example, set as read-only, etc.

In this example, the virtual patch panel unit 26 of the switch portion 2" provided with only the C plane selects a control unit 27 of any of the switch portions 2'. Then, the virtual patch panel unit 26 refers to the port identification information included in the data transferred by the redirect portion 1, and transfers data transferred by the redirect portion 1 to the virtual port of the selected control unit 27 corresponding to the port 11 identified by the port identification information. Here, the virtual patch panel unit 26 may remove the port identification information from the data to be transferred to the processing unit 27 (taking into account the compatibility between the program of the processing unit 27 and the program of the conventional switch).

The control unit 27 of the switch portion 2' receives data transfer through any of the virtual ports from the virtual patch panel unit 26 in the same switch portion 2' or from the virtual patch panel unit 26 in other switch portion 2" provided with only the C plane. Specific processes of the processing unit 27 may correspond to, for example, the processes of the L2 switch in the conventional network relay apparatus. Namely, the processing unit 27 extracts, from the data received through the virtual port, a header H including the information (MAC address) for specifying the transmission source of transmission destination. Then, the processing unit 27 obtains the information representing the process to be performed held in the process content holding unit 25 of the switch portion 2' or the switch portion 2" included in the virtual patch panel unit 26 of the data transfer source.

The processing unit 27 executes a process represented by the obtained information, and the process may be unicast to transmit data through a specific port 11 of the redirect portion 1, multicast to transmit data through a plurality of ports 11 of the redirect portion 1, data disposal, data encoding, encapsulation by adding header information, etc., counting the number of packets in the data or data capacities, QoS control, transmission control through a tunnel, and the like.

As a result of executing the process represented by the obtained information, if the processing unit 27 should determine one of the ports 11 of the redirect portion 1 as an output destination, and should output data through the port 11 determined as the output destination, the processing unit 27 outputs the data including the data body to the virtual patch panel unit 26 of the transfer source of the original data through the virtual port corresponding to the destined port 11 of the output destination.

Figure 13:
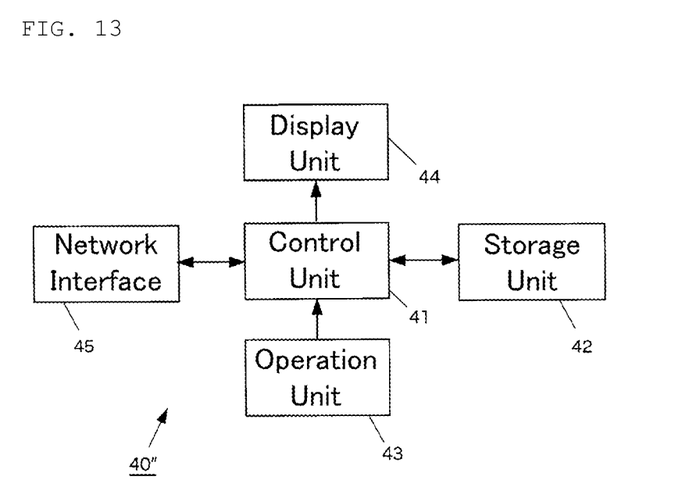
FIG. 13 is a constitutional block diagram showing an example of a terminal apparatus according to still another embodiment of the present disclosure.

In the present embodiment, a plurality of virtual machines may be operated on the terminal apparatus side, and an OS (operating system) may be operated on each virtual machine. At this time, a virtual network interface of each virtual machine may perform communication using a packet including individually set switch logic identification information. Specifically, such a terminal apparatus 40" is provided with a control unit 41, storage unit 42, an operation unit 43, a display unit 44, and a network interface 45.

Here, the control unit 41 is a program control device such as such as a CPU, etc., and operates in accordance with a program stored in the storage unit 42. The control unit 41 operates in accordance with realizing a plurality of virtual machines. Through the operation as each virtual machine, the control unit 41 performs data transmission/reception processes with the network relay apparatus 10 through the network. In the following examples, mutually different switch logic identification information is used among the virtual network interfaces respectively included in virtual machines.

The storage unit 42 is a memory device, etc., and holds programs to be executed by the control unit 41. The programs may be provided by being stored in a computer readable recording medium, such as DVD-ROM, etc., and copied to the storage unit 42. The storage unit 42 may operate as a work memory of the control unit 41.

The operation unit 43 is a keyboard, a mouse, and the like, which receives the input of instruction operations from the user, and outputs the content of the input instruction operations to the control unit 41. The display unit 44 is a display, etc., which displays the information in accordance with the instructions input from the control unit 41.

The network interface 45 is a network card, etc., which, in accordance with the instructions input from the control unit 41, adds a transmission source address (for example, MAC address), a destination address (for example, MAC address), and the switch logic identification information designated by the control unit 41, to the data to be transmitted, and transmits the added date to the network relay apparatus 10 (in case of a network relay apparatus 10 which does not have to explicitly include the switch logic identification information, this addition of the switch logic identification information may not be the explicit addition). Also, the network interface 45 detects the switch logic identification information included in the data received from the network relay apparatus 10, and specifies the virtual network interface using the detected switch logic identification information. The, the network interface 45 outputs the received data to the specified virtual network interface.

According to this example, when each OS operating on each virtual machine operating on each terminal apparatus 40" receives data transmission instruction from an application program operating under the control of the OS, following operations occur. Namely, the virtual network interface of the OS outputs the data to be transmitted, together with a transmission source address which is a virtual address assigned to the virtual network interface, and a transmission destination address of the data instructed by the application program, to the network interface 45. Then, the network interface 45 adds the data received from the control unit 41 with the transmission source address input from the control unit 41, the destination address, and the switch logic identification information (as mentioned above, the switch logic identification information does not have to be explicit), and transmits the added data to the network relay apparatus 10.

According this example, the OS of each virtual machine performs data transmission using the switch portion 2 identified by the set switch logic identification information, in the network relay apparatus 10.

Also, in this example, the network relay apparatus 10 includes the switch logic identification information relating to the switch portion 2 executing the process in the data destined to the terminal apparatus 40" (destined to the virtual network interface of any of the OSs operating in the terminal apparatus 40")

The network interface 45 of the terminal apparatus 40" refers to the switch logic identification information included in the data received from the network relay apparatus 10, and outputs the received data to the virtual network interface of the OS using the switch logic identification information that has been referred to.

Accordingly, when the network relay apparatus 10 includes a switch portion 2 which uses an address having a bit length longer than the MAC address (extended MAC address), instead of the MAC address, communication using the extended MAC address may be performed on the OSs of some virtual machines in the terminal apparatus 40", while communication using the conventional MAC address may be performed on the OSs of other virtual machines in the terminal apparatus 40".

[Example of Switching within One OS]

Here, an example wherein the control unit 41 of the terminal apparatus 40" operates a plurality of virtual machines has been explained, but the present embodiment is not limited thereto. For example, when the control unit 41 executes only one OS, the control unit 41 may execute the following processes as processes of the OS.

Namely, the control unit 41 receives, from the user, an instruction for selecting one piece of switch logic identification information from among a plurality of pieces of switch logic identification information corresponding to the plurality of switch portions 2 in the network relay apparatus 10.

In response to the data transmission instruction from the application program operating under the control of the OS, the control unit 41 uses a preset address as the transmission source address, and outputs the data to be transmitted together with the transmission source address, the transmission destination address instructed by the application program, and the selected switch logic identification information, to the network interface 45. The network interface 45 adds the transmission source address input from the control unit 41, the destination address, and the switch logic identification information (as mentioned above, the switch logic identification information does not have to be explicitly included), to the data input from the control unit 41, and transmits the data after addition to the network relay apparatus 10.

According to this example, data transmission is performed using a switch portion 2 in the network relay apparatus 10, the switch portion 2 being identified by the switch logic identification information selected by the user. In this example, a transmission source address and a destination address obtaining method are associated for each switch logic identification information selectable by a user, and stored in the storage unit 42. The control unit 41 uses the transmission source address associated with the selected switch logic identification information, and obtains the destination address by an obtaining method associated with the selected switch logic identification information (the method may be a program for performing the obtaining process).

Also in this example, the network relay apparatus 10 includes the switch logic identification information relating to the switch portion 2 which executes the process, in the data destined to the terminal apparatus 40" (destined to the virtual network interface of any of the OSs operating in the terminal apparatus 40") (as mentioned above, when the explicit inclusion is not necessary, the switch logic identification information does not have to be explicitly included).

The network interface 45 of the terminal apparatus 40" refers to the switch logic identification information included in the data received from the network relay apparatus 10, and when the switch logic identification information extracted from the data matches the switch logic identification information selected by the user, the received data is output to the control unit 41.

Accordingly, for example, when a switch portion 2 using cache is included in the network relay apparatus 10, if the user of the terminal apparatus 40" selects the switch logic identification information for selecting the switch portion 2 which performs communication using cache, the terminal apparatus 40" performs communication using cache, whereas if the user selects the switch logic identification information for selecting the switch portion 2 which performs communication without using cache, the terminal apparatus 40" performs communication without using cache. Namely, the user can select whether or not using cache.

As still another example, switch logic identification information included in the data to be transmitted may be made selectable for each application program. In this case, the application program uses a preset address as a transmission destination address, and outputs the data to be transferred together with the transmission source address, data transmission destination address, and the selected switch logic identification information, to the network interface 45 (the OS directly outputs the data input from the application program to the network interface 45).

The network interface 45 adds the transmission source address input from the control unit 41, the destination address, and the switch logic identification information (which may not be explicit) to the data input from the control unit 41, and transmits the data after the addition to the network relay apparatus 10.

In this example, a transmission source address and a destination address obtaining method are associated for each switch logic identification information selectable by a user, and stored in the storage unit 42. As a process of the application program, the control unit 41 uses the transmission source address associated with the selected switch logic identification information, and obtains the destination address by an obtaining method associated with the selected switch logic identification information (the method may be a program for performing the obtaining process).

The network interface 45 of the terminal apparatus 40" outputs the data received from the network relay apparatus 10 to the control unit 41. The control unit 41 refers to the switch logic identification information included in the data, and when the switch logic identification information included in the data matches the selected switch logic identification information, the process using the data is performed in the process of the application program.

The network relay apparatus 10 may perform communication with the terminal apparatus 40 via a wireless LAN. In this case, the network relay apparatus 10 may function as an access point of the wireless LAN, or an access point of wireless communication such as a base station of wide-area wireless communication such as 3G, 4G, etc.

Also, the network relay apparatus 10 may transmit the data received from the terminal apparatus 40 to an external network (for example, conventional ordinary network) in which inclusion of the switch logic identification information is not possible (or the switch logic identification information may be ignored or deleted). In this case, the response to the transmitted data may not include the switch logic identification information. Therefore, the network relay apparatus 10 uses a technology usually referred to as NAT (Network Address Translation) technology, etc., and when the network relay apparatus 10 receives the response from the external network, the data corresponding to the response is identified from among the data transmitted in the past, and the switch logic identification information related to the identified data may be (explicitly or implicitly) added to the received response data and processed. Accordingly, the network relay apparatus 10 according to the present embodiment can be connected to the commonly-used Internet, and the terminal apparatus 40 can obtain responses from various sites accessible through the Internet.

The invention claimed is:

1. A network relay apparatus comprising a processor, memory, a redirect portion and m switch portions (m>=1);
    the redirect portion comprising,
    n communication ports (n>1),
    a reception device which receives data including information for selecting one of the switch portions and data body which is to be transmitted, from any one of the communication ports,
    a transfer device which selects a switch portion as an output destination on the basis of the information for switch selection, and transfers data including the data body to the selected switch portion, and
    a transmission device which receives the data including the data for specifying the communication port selected as the output destination and the data body, from the switch portion which has transferred the data, and transmits data including the data body through the communication port which is specified as the output destination by the information; and each of the switch portions comprising,
a process content holding device which holds instruction information representing the content of a designated process,
a processing device which refers to the held instruction information, and executes the process regarding the data to be transferred from the redirect portion, and
a transfer device which, on the basis of the result of the process execution, if the data body included in the data to be transferred from the redirect portion is output, transfers data including the data body and the information specifying the communication port selected as the output destination, to the redirect portion,
wherein the processing device refers to the instruction information, and executes the process relating to at least part of the port identification information or the data body included in the data transferred from the redirect portion.

2. A network relay according to claim 1, wherein
the transfer device of the redirect portion transfers data including port identification information for specifying the communication port which has received the data, and the data body, to the selected switch portion, and
the process content holding device holds instruction information representing the content of a process to be executed which was designated by a user in relation to at least a part of the port identification information or the data body.

* * * * *